(12) United States Patent
Nagata et al.

(10) Patent No.: US 8,654,288 B2
(45) Date of Patent: Feb. 18, 2014

(54) METHOD FOR MANUFACTURING LIQUID CRYSTAL DISPLAY DEVICE INCLUDING FORMING ALIGNMENT SUSTAINING LAYERS

(75) Inventors: Hisashi Nagata, Osaka (JP); Junichi Yamada, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 487 days.

(21) Appl. No.: 13/057,367

(22) PCT Filed: Aug. 3, 2009

(86) PCT No.: PCT/JP2009/003685
§ 371 (c)(1),
(2), (4) Date: Feb. 3, 2011

(87) PCT Pub. No.: WO2010/016224
PCT Pub. Date: Feb. 11, 2010

(65) Prior Publication Data
US 2011/0141419 A1    Jun. 16, 2011

(30) Foreign Application Priority Data

Aug. 5, 2008  (JP) ................................ 2008-201594

(51) Int. Cl.
*G02F 1/1337* (2006.01)
*G02F 1/141* (2006.01)
*G02F 1/1333* (2006.01)

(52) U.S. Cl.
USPC ........... 349/124; 349/123; 349/125; 349/126; 349/127; 349/129; 349/131; 349/133; 349/90; 349/92; 349/94

(58) Field of Classification Search
USPC ............... 349/136, 93, 92, 90, 123–127, 129, 349/131, 133, 94
See application file for complete search history.

(56) References Cited

U.S. PATENT DOCUMENTS

| 5,296,847 | A | 3/1994 | Takeda et al. |
| 6,661,488 | B1 | 12/2003 | Takeda et al. |

(Continued)

FOREIGN PATENT DOCUMENTS

| JP | 2506822 | 4/1996 |
| JP | 2002-357830 | 12/2002 |

(Continued)

OTHER PUBLICATIONS

English translation of the International Preliminary Report on Patentability mailed Mar. 17, 2011 in corresponding PCT Application No. PCT/ JP2009/003685.
International Search Report for PCT/JP2009/003685, mailed Sep. 1, 2009.

*Primary Examiner* — Bumsuk Won
*Assistant Examiner* — Jia Pan
(74) *Attorney, Agent, or Firm* — Nixon & Vanderhye, P.C.

(57) ABSTRACT

A method for fabricating a liquid crystal display device includes providing an LCD panel that includes a photopolymerizable compound in its liquid crystal layer; and forming alignment sustaining layers by polymerizing the photopolymerizable compound in the liquid crystal layer of the LCD panel with the liquid crystal layer irradiated with light and supplied with a voltage simultaneously. The forming the alignment sustaining layers includes the steps of: i) applying a predetermined voltage between a pixel electrode and a counter electrode while a switching element is in ON state; and ii) changing the voltage at a storage capacitor counter electrode into a voltage, of which the polarity is opposite to a voltage at the storage capacitor counter electrode in the step i), after the switching element in ON state has been turned OFF.

5 Claims, 12 Drawing Sheets

(56) References Cited

U.S. PATENT DOCUMENTS

| | | |
|---|---|---|
| 6,903,796 B2 | 6/2005 | Kataoka |
| 6,909,415 B2 * | 6/2005 | Kumagawa et al. ............ 345/92 |
| 7,113,241 B2 | 9/2006 | Hanaoka |
| 7,169,449 B2 | 1/2007 | Nakanishi et al. |
| 7,215,395 B2 | 5/2007 | Kubo et al. |
| 7,782,346 B2 * | 8/2010 | Akiyama ...................... 345/694 |
| 7,843,533 B2 * | 11/2010 | Noguchi et al. .............. 349/114 |
| 8,456,583 B2 * | 6/2013 | Shimoshikiryoh et al. ..... 349/39 |
| 2003/0048401 A1 | 3/2003 | Hanaoka et al. |
| 2003/0067579 A1 | 4/2003 | Inoue et al. |
| 2005/0128371 A1 * | 6/2005 | Ueda et al. ...................... 349/33 |
| 2007/0035691 A1 * | 2/2007 | Sugiura et al. ................ 349/187 |
| 2009/0021658 A1 * | 1/2009 | Takeuchi et al. ................ 349/37 |

FOREIGN PATENT DOCUMENTS

| | | |
|---|---|---|
| JP | 3402277 | 2/2003 |
| JP | 2003-177408 | 6/2003 |
| JP | 2004-301979 | 10/2004 |

\* cited by examiner

FIG.2
(a)
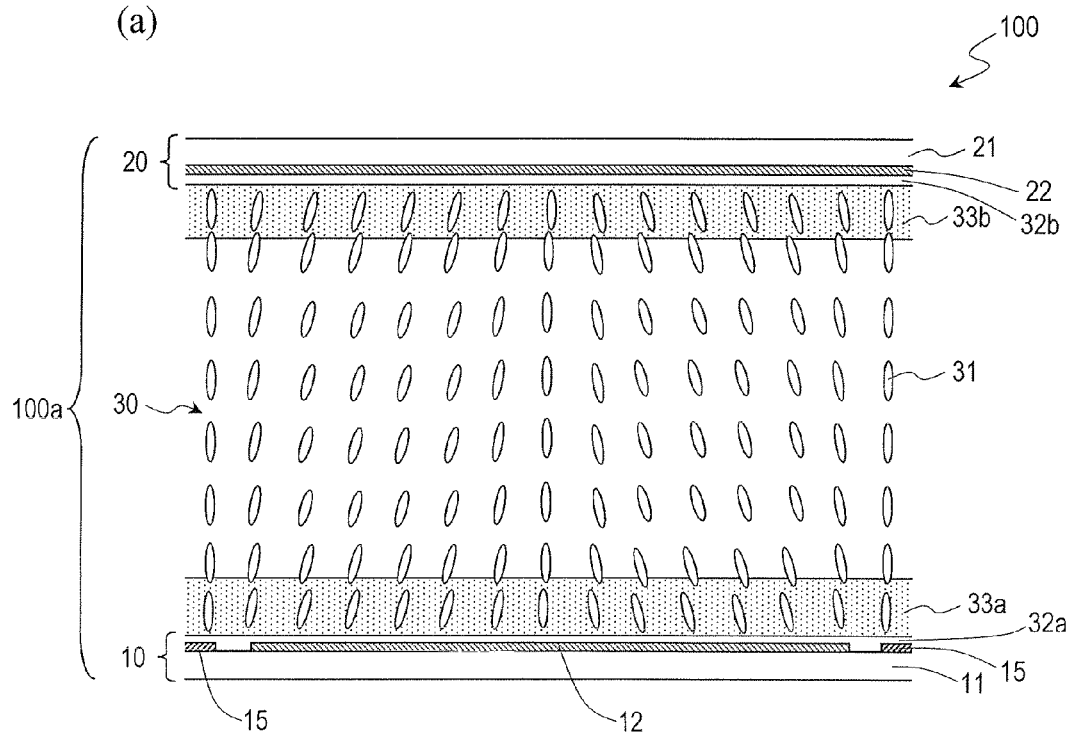
(b)
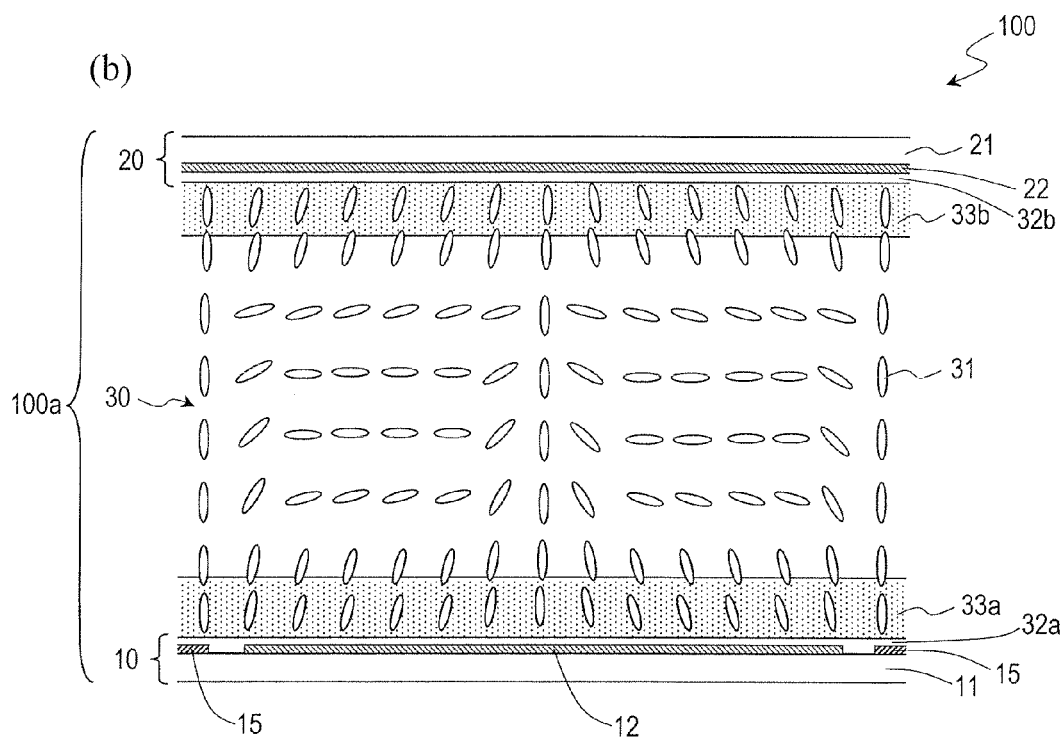

FIG.5
(a)
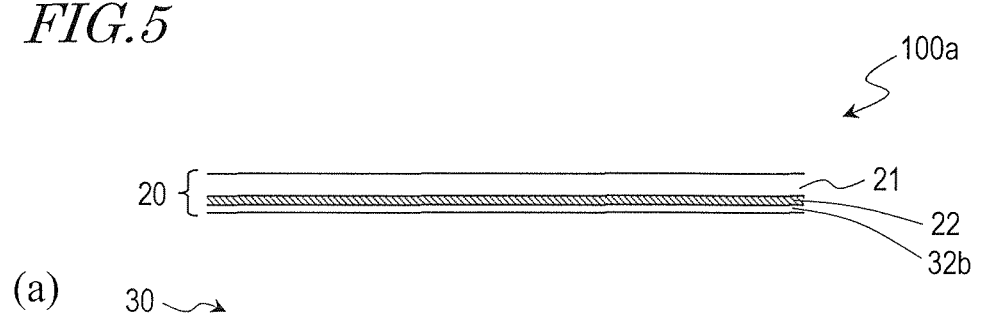
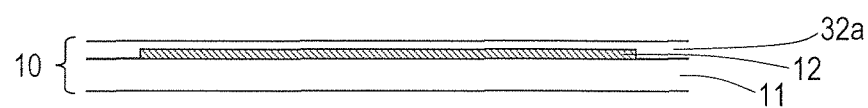
(b)
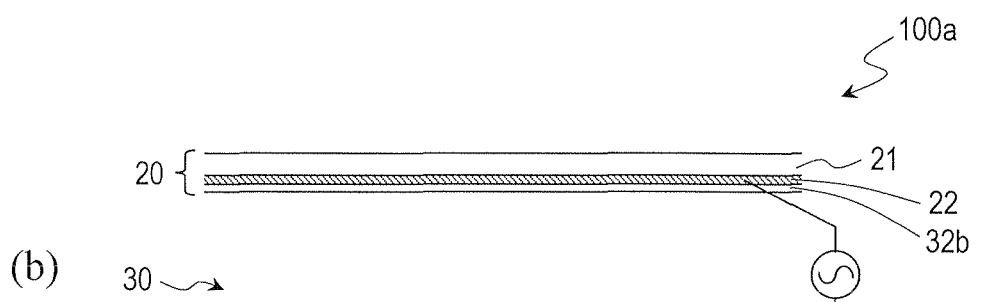
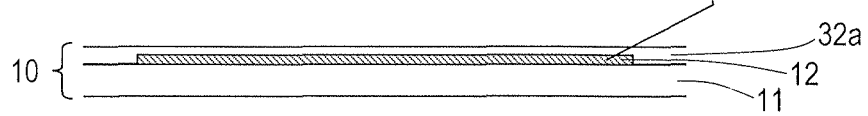
(c)
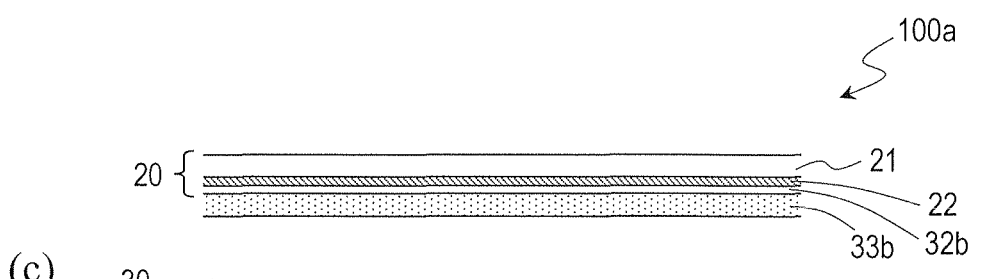
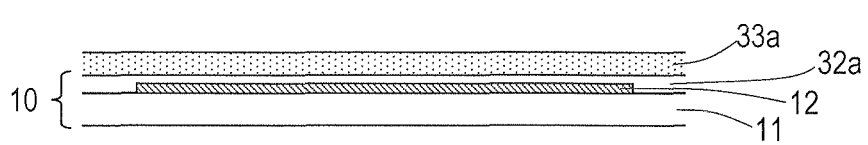

VOLTAGE [V] APPLIED TO LIQUID CRYSTAL LAYER DURING PSA PROCESS

ESTIMATED VOLTAGE [V] TO BE APPLIED TO LIQUID CRYSTAL LAYER

ESTIMATED VOLTAGE [V] TO BE APPLIED TO LIQUID CRYSTAL LAYER

ESTIMATED VOLTAGE [V] TO BE APPLIED TO LIQUID CRYSTAL LAYER

US 8,654,288 B2

METHOD FOR MANUFACTURING LIQUID CRYSTAL DISPLAY DEVICE INCLUDING FORMING ALIGNMENT SUSTAINING LAYERS

This application is the U.S. national phase of International Application No. PCT/JP2009/003685, filed 3 Aug. 2009, which designated the U.S. and claims priority to Japanese Application No, 2008-201594, filed 5 Aug. 2008, the entire contents of each of which are hereby incorporated by reference.

TECHNICAL FIELD

The present invention relates to a liquid crystal display device and a method for fabricating the device, and more particularly relates to a liquid crystal display device to be driven by capacitive coupling and a method for fabricating such a device.

BACKGROUND ART

A liquid crystal display has been used lately as the display of various electronic devices. A liquid crystal display device includes two substrates and a liquid crystal layer interposed between the two substrates and conducts a display operation by regulating the voltage applied to the liquid crystal layer on a pixel-by-pixel basis so as to vary the orientation states of the liquid crystal layer.

It is known that a liquid crystal display device may have some display non-uniformity due to a variation in the thickness of the liquid crystal layer (which is also called a "cell thickness"), which is one of major problems with liquid crystal display devices. The cell thickness is usually defined by photo-spacers. However, as those photo-spacers finished may have various sizes, the cell thickness may be non-uniform within the plane of the display screen, which in turn produces a distribution of retardations (i.e., the phase differences caused by the liquid crystal layer on the incoming light) within that plane, thus generating such display non-uniformity.

FIG. 13 shows the voltage-transmittance characteristics of a liquid crystal display device with varying cell thicknesses. In FIG. 13, shown are a curve representing a voltage-transmittance characteristic in a region with a normal cell thickness (of 3.0 μm, specifically) and a curve representing a voltage-transmittance characteristic in a region with a cell thickness that is smaller than the normal value by 0.3 μm. In such a region with the smaller cell thickness, the retardations are also relatively small. That is why as can be seen from FIG. 13, the voltage-transmittance curve in the region with the smaller cell thickness is less steep than the voltage-transmittance curve in the region with the normal cell thickness. That is to say, when compared at the same applied voltage, the region with the smaller cell thickness has a lower transmittance than the region with the normal cell thickness. Consequently, the region with the smaller cell thickness will be sensed as a region with the lower brightness (i.e., a darker region) on the display screen. On the other hand, a region with a greater cell thickness than the normal one will be sensed as a yellowish region with the higher brightness (i.e., a brighter region) on the display screen.

CITATION LIST

Patent Literature

Patent Document No. 1: Japanese Patent Publication No. 3402277

SUMMARY OF INVENTION

Technical Problem

Such display non-uniformity gets even more noticeable if a driving method called "capacitive coupling" is adopted. The capacitive coupling method was proposed as a technique for increasing the voltage applied to the liquid crystal layer efficiently without increasing the power dissipation (see Patent Document No. 1, for example).

According to this driving method, after a predetermined voltage has been written on a pixel, the potential at its pixel electrode gets bootstrapped by a storage capacitor. More specifically, while a gate bus line is scanned, a CS bus line is also scanned, thereby boosting the voltage applied to the liquid crystal layer by using the step-up (or step-down) voltage caused by capacitive coupling. In this manner, a sufficiently high voltage can be applied to the liquid crystal layer without driving the counter electrode with alternating current.

In this case, the step-up voltage (or step-down voltage) Vbs is represented by the following equation:

$$Vbs = (Ccs/Cpix) \cdot \Delta Vcs$$

where Ccs is the capacitance value of the storage capacitor, Cpix is the capacitance value of a pixel capacitor, and ΔVcs is the amplitude of a voltage on the CS bus line. The capacitance value Cpix of the pixel capacitor is approximately equal to the sum of the respective capacitance values Clc and Ccs of a liquid crystal capacitor and the storage capacitor. That is to say, Cpix≈Clc+Ccs.

As can be seen from this equation, the step-up voltage Vbs is determined by the ratio of the capacitance value Ccs of the storage capacitor to that (Cpix) of the pixel capacitor. That is why if the capacitance value Cpix of the pixel capacitor varies due to a variation in cell thickness, the step-up voltage Vbs will also vary.

For example, if the cell thickness is smaller than its normal value, the capacitance value Clc of the liquid crystal capacitor increases because Clc is inversely proportional to the thickness of the liquid crystal layer. Since the capacitance value Cpix of the pixel capacitor increases as a result, the step-up voltage Vbs decreases as can be seen from the equation described above. Therefore, in a region with the smaller cell thickness, the voltage applied to the liquid crystal layer decreases compared to the other region with the normal cell thickness. Consequently, in a normally black mode liquid crystal display device, such a region with the smaller cell thickness looks darker than the other region with the normal cell thickness.

On the other hand, if the cell thickness is greater than the normal value, the capacitance value Clc of the liquid crystal capacitor decreases. Since the capacitance value Cpix of the pixel capacitor decreases as a result, the step-up voltage Vbs increases. Therefore, in a region with the greater cell thickness, the voltage applied to the liquid crystal layer increases compared to the other region with the normal cell thickness. Consequently, in a normally black mode liquid crystal display device, such a region with the greater cell thickness looks brighter than the other region with the normal cell thickness.

In a liquid crystal display device to be driven by such a capacitive coupling method, the display non-uniformity caused due to a difference in retardation (i.e., an optical path difference) described above will get combined with the display non-uniformity caused due to a variation in the effective voltage applied to the liquid crystal layer, thus debasing the display quality significantly.

FIG. 14 shows the voltage-transmittance characteristic of a liquid crystal display device to be driven by capacitive coupling. In FIG. 14 shown are a curve representing a voltage-transmittance characteristic in a region with a normal cell thickness (of 3.0 μm, specifically) and a curve representing a voltage-transmittance characteristic in a region with a cell thickness that is smaller than the normal value by 0.3 μm. Also, in the graph shown in FIG. 14, the abscissa represents the voltage that is supposed to be applied to the liquid crystal layer and that has been calculated based on the voltages externally applied to a source bus line and a CS bus line and the capacitance values (normal values) of the respective capacitors.

As described above, in a region with the smaller cell thickness, the voltage applied to the liquid crystal layer decreases compared to the other region with the normal cell thickness. That is why the voltage-transmittance curve in such a region with the smaller cell thickness has shifted to a high voltage range compared to the voltage-transmittance curve in the other region with the normal cell thickness as shown in FIG. 14. That is to say, supposing the driving condition remains the same, a decrease in display luminance, of which the magnitude corresponds to the difference between the ordinates shown in FIG. 14, will be sensed in such a region with the smaller cell thickness compared to the other region with the normal cell thickness.

In the foregoing description, the cell thickness is supposed to vary within the plane of the display screen. However, sometimes the cell thickness varies from one panel to another. Such a variation in cell thickness between panels may be caused due to a variation in the size of photo-spacers finished or a variation in the amount of the liquid crystal material injected. And if the cell thickness varies from one panel to another, the voltage-transmittance characteristic will also be different between those panels (i.e., between liquid crystal display devices themselves). In this description, such a difference in display performance between liquid crystal display devices will also be referred to herein as "display non-uniformity".

Such display non-uniformity due to a difference in the voltage applied to the liquid crystal layer also arises on a similar principle even if some variation has occurred in the capacitance value Ccs of the storage capacitor, not in the cell thickness. The capacitance value Ccs of the storage capacitor varies when the thickness of an insulating layer in the storage capacitor locally deviates from its normal value for some reason (e.g., if a portion of the insulating layer at an end of the mother glass has a different thickness from the rest of the insulating layer).

FIG. 15 shows the voltage-transmittance characteristic of a liquid crystal display device in which the capacitance value Ccs of the storage capacitor varies. In FIG. 15 shown are a curve representing a voltage-transmittance characteristic in a region with a normal storage capacitor capacitance value CCs and a curve representing a voltage-transmittance characteristic in a region that has a capacitance value Ccs that is greater than the normal value by 10% because the insulating film has a smaller thickness than the normal value.

In such a region with the increased storage capacitor capacitance value Ccs, the step-up voltage Vbs increases, and therefore, a greater voltage is applied to the liquid crystal layer than in the region with the normal capacitance value Ccs. That is why the voltage-transmittance curve in such a region with the increased capacitance value Ccs has shifted to a low voltage range compared to the voltage-transmittance curve in the other region with the normal capacitance value Ccs as shown in FIG. 15. That is to say, supposing the driving condition remains the same, an increase in display luminance, of which the magnitude corresponds to the difference between the ordinates shown in FIG. 15, will be sensed in such a region with the increased capacitance value Ccs compared to the other region with the normal capacitance value Ccs.

As described above, if a liquid crystal display device is driven by capacitive coupling, any variation in either cell thickness or storage capacitor capacitance value Ccs will cause display non-uniformity. As a result, its display quality will be debased.

It is therefore an object of the present invention to provide a liquid crystal display device, which can minimize such display non-uniformity even when driven by capacitive coupling, and also provide a method for fabricating such a device.

Solution to Problem

An LCD fabricating method according to the present invention is a method for fabricating a liquid crystal display device that includes: an LCD panel that has a first substrate, a second substrate and a liquid crystal layer interposed between the first and second substrates; and a number of pixels that are arranged in matrix. The first substrate includes: a pixel electrode, which is arranged in an associated one of the pixels; a switching element, which is electrically connected to the pixel electrode; a scan line for supplying a scan signal to the switching element; and a signal line for supplying a display signal to the switching element. The second substrate includes a counter electrode that faces the pixel electrode. Each pixel includes: a liquid crystal capacitor that is formed by its associated pixel electrode, the liquid crystal layer and the counter electrode; and a storage capacitor that is formed by a storage capacitor electrode, an insulating layer and a storage capacitor counter electrode. The storage capacitor electrode is electrically connected to the pixel electrode. The storage capacitor counter electrode faces the storage capacitor electrode with the insulating layer interposed between them. The LCD panel further includes: two alignment films, one of which is arranged between the pixel electrode and the liquid crystal layer and the other of which is arranged between the counter electrode and the liquid crystal layer; and alignment sustaining layers, each of which is arranged on the surface of an associated one of the alignment films so as to contact with the liquid crystal layer, is made of a photopolymerization product, and defines the pretilt directions of liquid crystal molecules in the liquid crystal layer when no voltage is applied to the liquid crystal layer. The method includes the steps of: providing the LCD panel that includes a photopolymerizable compound in the liquid crystal layer; and forming the alignment sustaining layers by polymerizing the photopolymerizable compound in the liquid crystal layer of the LCD panel with the liquid crystal layer irradiated with light and supplied with a voltage simultaneously. The step of forming the alignment sustaining layers includes the steps of: i) applying a predetermined voltage between the pixel electrode and the counter electrode while the switching element is in ON state; and ii) changing the voltage at the storage capacitor counter electrode into a voltage, of which the polarity is opposite to the voltage at the storage capacitor counter electrode in the step i), after the switching element in ON state has been turned OFF.

In one preferred embodiment, the step of forming the alignment sustaining layers includes applying a constant voltage to the counter electrode and an oscillating voltage to the signal line, respectively.

In another preferred embodiment, in the step ii), as the voltage at the storage capacitor counter electrode varies, the voltage at the pixel electrode also varies. The step of forming the alignment sustaining layers further includes the step iii) of changing a voltage on the signal line after the switching element in ON state has been turned OFF. The voltages on the signal line and at the pixel electrode that have been changed in the steps iii) and ii), respectively, are substantially equal to each other.

In still another preferred embodiment, the step of forming the alignment sustaining layers includes applying a constant voltage to the signal line and an oscillating voltage to the counter electrode, respectively.

In yet another preferred embodiment, each of the two alignment films is a vertical alignment film, and the liquid crystal layer is made of a liquid crystal material with negative dielectric anisotropy.

A liquid crystal display device according to the present invention includes: an LCD panel that has a first substrate, a second substrate and a liquid crystal layer interposed between the first and second substrates; and a number of pixels that are arranged in matrix. The first substrate includes a pixel electrode, which is arranged in an associated one of the pixels. The second substrate includes a counter electrode that faces the pixel electrode. Each pixel includes: a liquid crystal capacitor that is formed by its associated pixel electrode, the liquid crystal layer and the counter electrode; and a storage capacitor that is formed by a storage capacitor electrode, an insulating layer and a storage capacitor counter electrode. The storage capacitor electrode is electrically connected to the pixel electrode. The storage capacitor counter electrode faces the storage capacitor electrode with the insulating layer interposed between them. The LCD panel further includes: two alignment films, one of which is arranged between the pixel electrode and the liquid crystal layer and the other of which is arranged between the counter electrode and the liquid crystal layer; and alignment sustaining layers, each of which is arranged on the surface of an associated one of the alignment films so as to contact with the liquid crystal layer, is made of a photopolymerization product, and defines the pretilt angles and pretilt azimuths of liquid crystal molecules in the liquid crystal layer when no voltage is applied to the liquid crystal layer. The thickness of the liquid crystal layer varies within a display plane. The smaller the thickness of the liquid crystal layer in a region within the display plane is, the larger the pretilt angles defined by the alignment sustaining layers in that region are.

Another liquid crystal display device according to the present invention includes: an LCD panel that has a first substrate, a second substrate and a liquid crystal layer interposed between the first and second substrates; and a number of pixels that are arranged in matrix. The first substrate includes a pixel electrode, which is arranged in an associated one of the pixels. The second substrate includes a counter electrode that faces the pixel electrode. Each pixel includes: a liquid crystal capacitor that is formed by its associated pixel electrode, the liquid crystal layer and the counter electrode; and a storage capacitor that is formed by a storage capacitor electrode, an insulating layer and a storage capacitor counter electrode. The storage capacitor electrode is electrically connected to the pixel electrode. The storage capacitor counter electrode faces the storage capacitor electrode with the insulating layer interposed between them. The LCD panel further includes: two alignment films, one of which is arranged between the pixel electrode and the liquid crystal layer and the other of which is arranged between the counter electrode and the liquid crystal layer; and alignment sustaining layers, each of which is arranged on the surface of an associated one of the alignment films so as to contact with the liquid crystal layer, is made of a photopolymerization product, and defines the pretilt angles and pretilt azimuths of liquid crystal molecules in the liquid crystal layer when no voltage is applied to the liquid crystal layer. The thickness of the insulating layer in the storage capacitor varies within a display plane. And the smaller the thickness of the insulating layer in a region within the display plane is, the smaller the pretilt angles defined by the alignment sustaining layers in that region are.

In one preferred embodiment, the liquid crystal display device of the present invention is driven by capacitive coupling.

In another preferred embodiment, each of the two alignment films is a vertical alignment film, and the liquid crystal layer is made of a liquid crystal material with negative dielectric anisotropy.

Advantageous Effects of Invention

The present invention provides a liquid crystal display device, which can minimize such display non-uniformity even when driven by capacitive coupling, and also provides a method for fabricating such a device.

BRIEF DESCRIPTION OF DRAWINGS

FIGS. 2(a) and 2(b) are cross-sectional views thereof as viewed on the plane 2A-2A' shown in FIG. 1, wherein FIGS. 2(a) and 2(b) illustrate how liquid crystal molecules are aligned in black display state (when no voltage is applied to the liquid crystal layer) and in white display state (when a voltage is applied thereto), respectively.

FIGS. 5(a) through 5(c) are cross-sectional views schematically illustrating respective manufacturing process steps to be performed to fabricate the liquid crystal display device 100.

DESCRIPTION OF EMBODIMENTS

Hereinafter, preferred embodiments of the present invention will be described with reference to the accompanying drawings. It should be noted that the present invention is in no way limited to the specific preferred embodiments to be described below.

Figure 1:
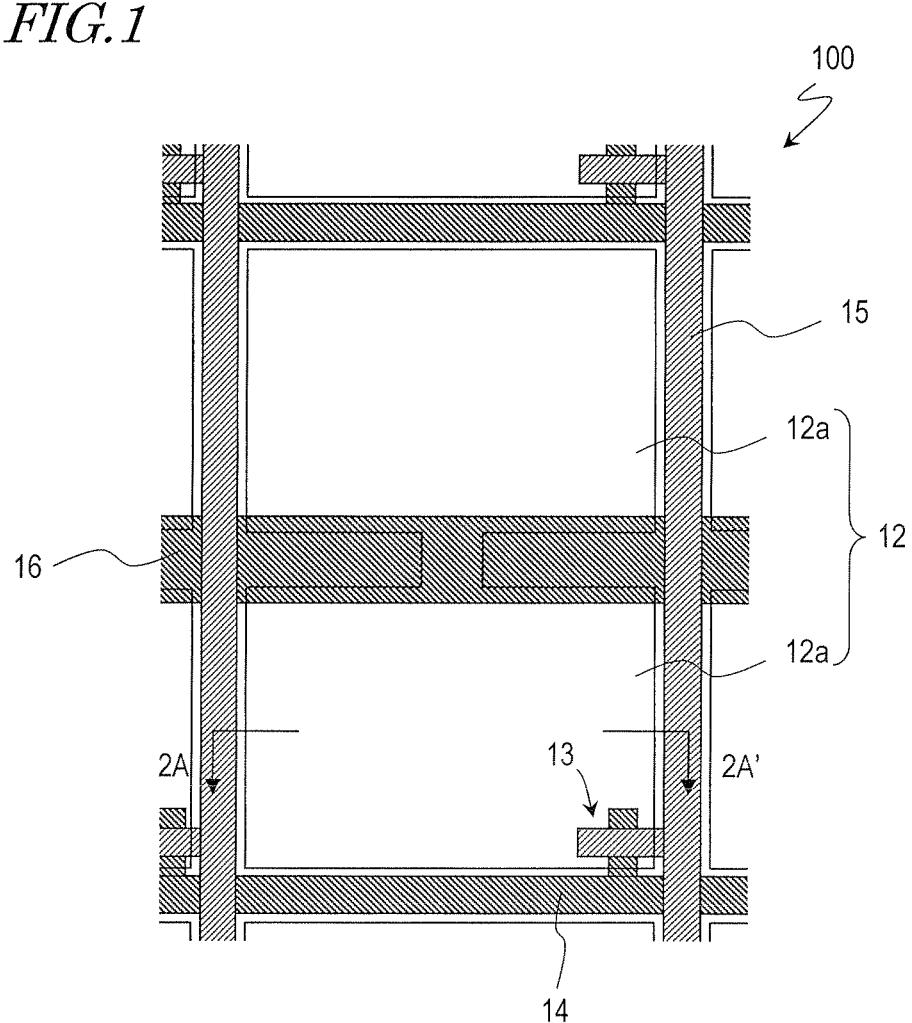
FIG. 1 is a plan view schematically illustrating a portion of a liquid crystal display device 100 as a preferred embodiment of the present invention, which is allocated to one pixel.
Figure 3:
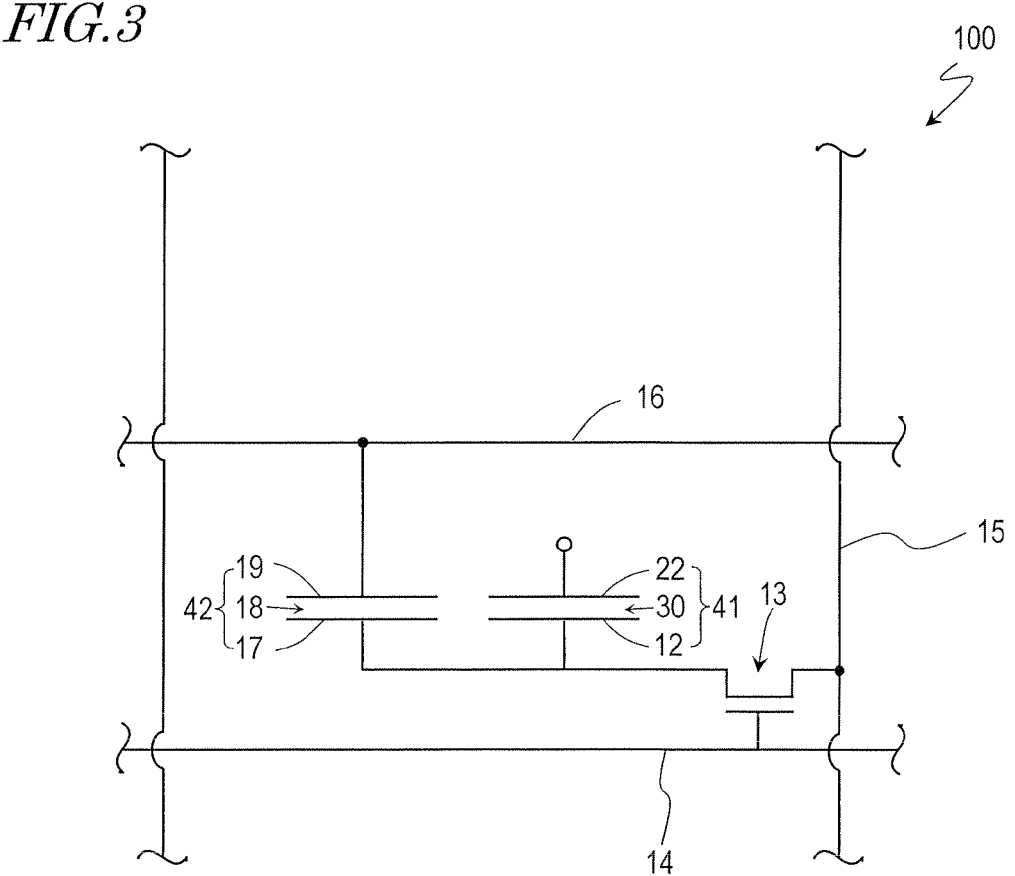
FIG. 3 is an equivalent circuit diagram schematically illustrating a single pixel portion of the liquid crystal display device 100.

FIGS. 1 through 3 illustrate a liquid crystal display device 100 as a specific preferred embodiment of the present invention. FIG. 1 is a plan view schematically illustrating a portion of the liquid crystal display device 100 that is allocated to one pixel, while FIGS. 2(a) and 2(b) are cross-sectional views thereof as viewed on the plane 2A-2A' shown in FIG. 1. FIGS. 2(a) and 2(b) also illustrate how liquid crystal molecules are aligned in black display state (when no voltage is applied to the liquid crystal layer) and in white display state (when a voltage is applied thereto), respectively. And FIG. 3 illustrates an equivalent circuit of a single pixel.

The liquid crystal display device 100 of this preferred embodiment carries out a display operation in CPA (continuous pinwheel alignment) mode, which is a kind of VA (vertical alignment) mode for conducting a display operation using a vertical alignment liquid crystal layer and in which the display operation can get done with wide viewing angles. The CPA mode is disclosed in Japanese Patent Application Laid-Open Publication No. 2003-43525, for example.

The liquid crystal display device 100 includes an LCD panel 100a and a number of pixels that are arranged in matrix. The LCD panel 100a has an active-matrix substrate (corresponding to the "first substrate") 10, a counter substrate (corresponding to the "second substrate") 20 and a liquid crystal layer 30 interposed between the active-matrix substrate 10 and the counter substrate 20.

The active-matrix substrate 10 includes: pixel electrodes 12, each of which is arranged in an associated one of the pixels; thin-film transistors (TFTs) 13, each of which is a switching element that is electrically connected to its associated pixel electrode 12; scan lines (gate bus lines) 14 for supplying a scan signal to the TFTs 13; and signal lines (source bus lines) 15 for supplying a display signal to the TFTs 13. The pixel electrodes 12, the TFTs 13, the scan lines 14 and the signal lines 15 are arranged on a transparent substrate (such as a glass substrate or a plastic substrate) 11. Storage capacitor lines 16 are also arranged on the transparent substrate 11.

Each of the pixel electrodes 12 includes multiple subpixel electrodes 12a. Although the pixel electrode 12 of the preferred embodiment shown in FIG. 1 includes two subpixel electrodes 12a, this is just an example and each pixel electrode 12 may have any other number of subpixel electrodes 12a as well. For example, the pixel electrode 12 may have three or more subpixel electrodes 12a, too. Moreover, the shape of the respective subpixel electrodes 12a does not have to be the substantially rectangular one shown in FIG. 1, either, but is preferably any other shape with a high degree of rotational symmetry (such as a substantially square or circular shape or a substantially rectangular shape with arc corners).

The counter substrate 20 includes a counter electrode 22 that faces the pixel electrodes 12. The counter electrode 22 is arranged on a transparent substrate 21 (which may be a glass substrate or a plastic substrate, for example). The pixel electrode 12 is provided for each of the huge number of pixels, but the counter electrode 22 is typically provided as a single transparent conductive film that faces all of those pixel electrodes 12. Although not shown in FIG. 2, typically color filters are further inserted between the transparent substrate 21 and the counter electrode 22. That is why the counter substrate 20 is also called a "color filter substrate".

As shown in FIG. 3, each pixel includes a liquid crystal capacitor 41, which is formed by the pixel electrode 12, the counter electrode 22 and the liquid crystal layer 30 interposed between those electrodes 12 and 22, and a storage capacitor 42, which is electrically connected in parallel to the liquid crystal capacitor 41. The storage capacitor 42 is formed by a storage capacitor electrode 17 that is electrically connected to the pixel electrode 12, an insulating layer 18 and a storage capacitor counter electrode that faces the storage capacitor electrode 17 with the insulating layer 18 interposed between them. The specific configuration of the storage capacitor 42 including the storage capacitor electrode 17 and the storage capacitor counter electrode 19 may be any of various known ones. For example, the storage capacitor electrode 17 and the signal line 15 may be formed by patterning the same metal layer and may be arranged so that the storage capacitor electrode 17 overlaps the storage capacitor line 16. And that portion of the storage capacitor line 16 overlapped by the storage capacitor electrode 17 may be used as the storage capacitor counter electrode 19.

Two vertical alignment films 32a and 32b are arranged between the pixel electrodes 12 and the liquid crystal layer 30 and between the counter electrode 22 and the liquid crystal layer 30, respectively. Also, although not shown in FIG. 2, two polarizers are arranged as crossed Nicols on the respective outer surfaces of the active-matrix substrate 10 and the counter substrate 20.

The liquid crystal layer 30 includes liquid crystal molecules 31 with negative dielectric anisotropy, and may further include a chiral agent, if necessary. When no voltage is applied to the liquid crystal layer 30, the liquid crystal molecules 31 are aligned substantially perpendicularly to the surface of the vertical alignment films 32a and 32b.

The liquid crystal layer 30 forms a plurality of liquid crystal domains on the pixel electrode 12 so that liquid crystal molecules in each of those domains have axial symmetry alignment upon the application of a predetermined voltage. Each of those liquid crystal domains is defined over an associated one of the subpixel electrodes 12a. In each liquid crystal domain, the liquid crystal molecules 31 are oriented in almost all directions (i.e., every possible direction within the plane of the substrate). That is why the liquid crystal display device 100 has excellent viewing angle characteristic. As used herein, the "axial symmetry alignment" is synonymous with the "radially-inclined alignment" as disclosed in Japanese Patent Application Laid-Open Publication No. 2003-43525 mentioned above. The liquid crystal molecules 31 with the axial symmetry alignment are oriented continuously around the center axis of the axial symmetry alignment (i.e., the center axis of the radially-inclined alignment) without forming any disclination line there.

Such liquid crystal domains with the axial symmetry alignment are produced because each of the subpixel electrodes 12a has outer edges just like those of an disconnected island that make an oblique electric field, which has been generated around the edges of the subpixel electrode 12a, apply alignment control force onto the liquid crystal molecules 31. The electric field generated around the edges of the subpixel electrode 12a is inclined toward the center of the subpixel electrode 12a, thus causing the liquid crystal molecules 31 to be oriented radially.

Optionally, the counter substrate 20 may have projections in order to stabilize the radially-inclined alignment. Each of those projections is arranged right over the center of its associated liquid crystal domain (i.e., the center of its associated subpixel electrode 12a). Those projections may be made of a transparent dielectric material (such as a resin material). Alternatively, the projections may be replaced with any other kind of alignment control structure (e.g., slits that have been cut through the counter electrode 22).

Two alignment sustaining layers 33a and 33b, which are made of a photopolymerization product, are further arranged on the surface of the vertical alignment films 32a and 32b so as to contact with the liquid crystal layer 30. These alignment sustaining layers 33a and 33b are obtained by polymerizing a photopolymerizable compound, which is included in advance in the liquid crystal material, with a voltage applied to the liquid crystal layer 30. As will be described later, the alignment sustaining layers 33a and 33b define the pretilt directions of the liquid crystal molecules 31 in the liquid crystal layer 30 when no voltage is applied to the liquid crystal layer 30. In this case, each pretilt direction is defined by the "pretilt azimuth" and the "pretilt angle". The "pretilt azimuth" is a vector that represents the orientation direction of a liquid crystal molecule 31 in the liquid crystal layer 30 to which no voltage is applied and that is projected onto the plane of the liquid crystal layer 30 (or the substrate). On the other hand, the "pretilt angle" is the angle defined by a liquid crystal molecule 31 with respect to the substrate plane.

Until the photopolymerizable compound is polymerized, the liquid crystal molecules 31 have their alignment controlled by the vertical alignment films 32a and 32b so as to be aligned substantially perpendicularly to the surface of the substrates. When a white display voltage is applied, an oblique electric field is generated around the edges of the pixel electrode 12 (or the subpixel electrode 12a), thereby aligning the liquid crystal molecules 31 so that the liquid crystal molecules 31 tilt toward a predetermined direction as shown in FIG. 2(b). As shown in FIG. 2(a), the alignment sustaining layers 33a and 33b that have been formed with a white display voltage applied thereto sustain (or memorize) the alignment that the liquid crystal molecules 31 had when the white display voltage was applied to the liquid crystal layer 30 even after that voltage has been removed (i.e., no voltage is applied anymore). In FIGS. 2(a) and 2(b), the alignment sustaining layers 33a and 33b are illustrated as a continuous film that covers the entire surface of the vertical alignment films 32a and 32b. However, the alignment sustaining layers 33a and 33b may also be formed discontinuously over the surface of the vertical alignment films 32a and 32b.

This liquid crystal display device 100 has such alignment sustaining layers 33a and 33b. That is why when no voltage is applied thereto, the liquid crystal layer 30 has an alignment state in which the liquid crystal molecules 31 pretilt in a predetermined direction as shown in FIG. 2(a). This alignment state agrees with that of the liquid crystal molecules 31 in the white display state shown in FIG. 2(b) (i.e., when a voltage is applied thereto). As a result, the stability and response of their alignment can be increased.

A technology that uses such alignment sustaining layers 33a and 33b is called a PSA (polymer sustained alignment) technology, which is disclosed in Japanese Patent Application Laid-Open Publications Nos. 2002-357830 and 2003-307720, for example.

Figure 4:
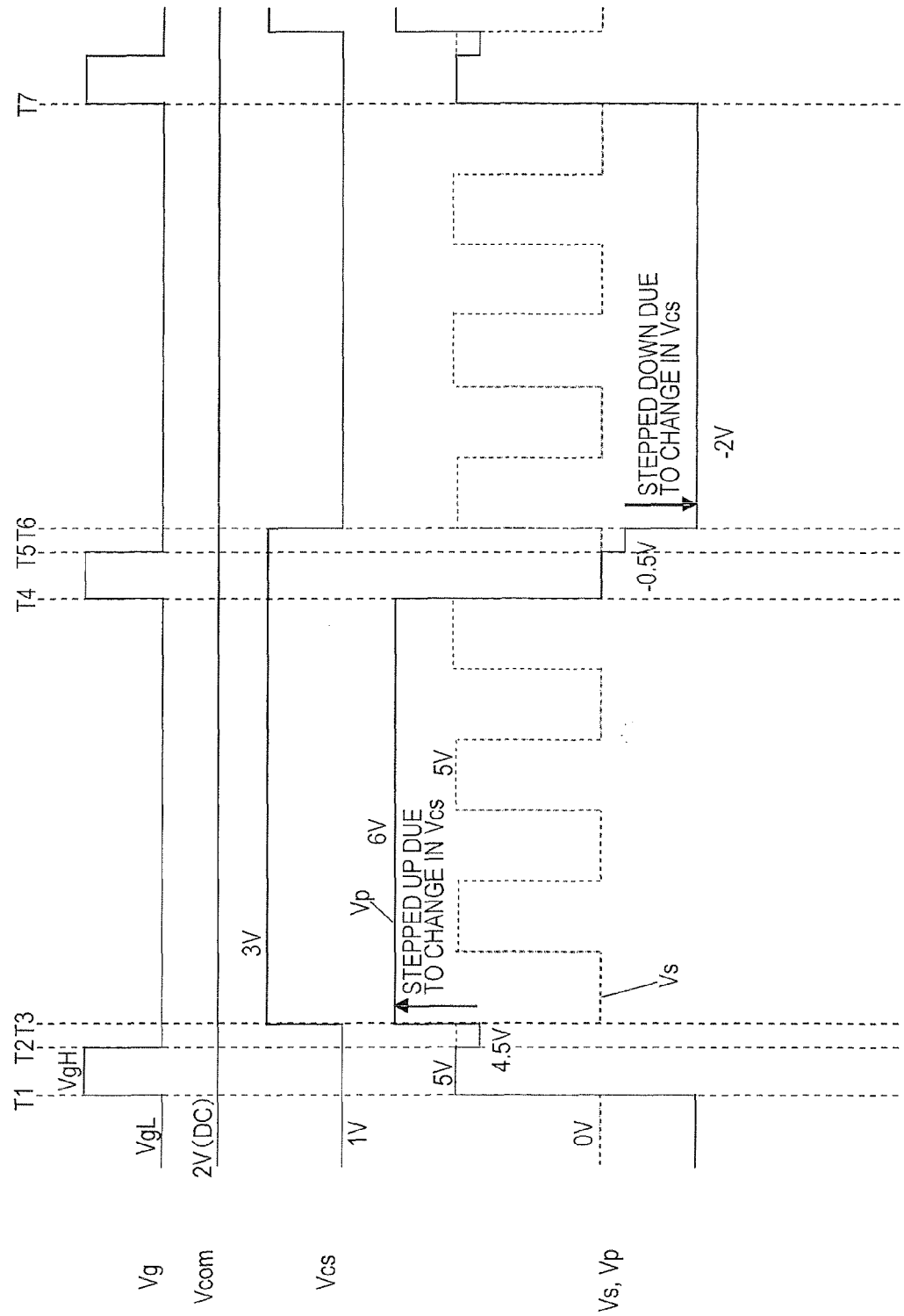
FIG. 4 shows exemplary waveforms of voltages to be applied when the device 100 is driven by capacitive coupling.

The liquid crystal display device 100 with such a structure is driven by capacitive coupling. In FIG. 4, shown are exemplary waveforms of voltages to be applied when the device 100 is driven by capacitive coupling. Specifically, FIG. 4 shows the waveforms of a voltage Vg on the scan line 14, a voltage Vcom at the counter electrode 22, a voltage Vcs on the storage capacitor line 16, a voltage Vs on the signal line 15, and a voltage Vp at the pixel electrode 12 when a white display operation is performed on a pixel.

First of all, when the voltage Vg on the scan line 14 rises from VgL to VgH at a time T1, the TFT 13 turns ON (i.e., gets electrically continuous) and the voltage Vs (of 5 V, in this example) on the signal line 15 is transferred to the pixel electrode 12, thereby charging the liquid crystal capacitor 41. In this case, the voltage Vs on the signal line 15 is also transferred to the storage capacitor electrode 17 and the storage capacitor 42 is also charged.

Next, when the voltage Vg on the scan line 14 falls from VgH to VgL at a time T2, the TFT 13 turns OFF (i.e., gets electrically discontinuous) and the pixel electrode 12 and the storage capacitor electrode 17 are electrically disconnected from the signal line 15. Immediately after that, due to a feedthrough phenomenon that has been caused by the parasitic capacitance of the TFT 13 and other factors, the voltage Vp at the pixel electrode 12 decreases by a certain amount (e.g., 0.5 V).

Subsequently, when the voltage Vcs on the storage capacitor line 16 changes (e.g., rises from 1 V to 3 V in this example) at a time T3, the voltage Vp at the pixel electrode 12 also changes (e.g., rises from 4.5 V to 6 V in this example). That is to say, the voltage Vp at the pixel electrode 12 is stepped up by a certain amount (of 1.5 V in this example).

After that, the voltage Vp at the pixel electrode that has been stepped up will be maintained until the voltage on the pixel is rewritten next time (i.e., through a time T4). And when the voltage Vg on the scan line 14 rises again from VgL to VgH at the time T4, the TFT 13 turns ON again, and the voltage Vs (of 0 V, in this example) on the signal line 15 is transferred to the pixel electrode 12 and the storage capacitor electrode 17, thereby charging the liquid crystal capacitor 41 and the storage capacitor 42.

Next, when the voltage Vg on the scan line 14 falls from VgH to VgL at a time T5, the TFT 13 turns OFF and the pixel electrode 12 and the storage capacitor electrode 17 are electrically disconnected from the signal line 15. Immediately after that, due to the feedthrough phenomenon, the voltage Vp at the pixel electrode 12 decreases by a certain amount (e.g., 0.5 V).

Subsequently, when the voltage Vcs on the storage capacitor line 16 changes (e.g., falls from 3 V to 1 V in this example) at a time T6, the voltage Vp at the pixel electrode 12 also changes (e.g., falls from −0.5 V to −2 V in this example). That is to say, the voltage Vp at the pixel electrode 12 is stepped down by a certain amount (of 1.5 V in this example).

After that, the voltage Vp at the pixel electrode 12 that has been stepped down will be maintained until the voltage on the pixel is rewritten next time (i.e., through a time T7). It should be noted that from the time T1 through the time T7, the voltage Vcom at the counter electrode 22 is always constant (e.g., 2 V in this example). That is to say, a DC voltage is applied to the counter electrode 22.

By performing such capacitive coupling driving, the voltage applied to the liquid crystal layer 30 can be stepped up. As a result, a voltage of a sufficient magnitude can be applied to the liquid crystal layer 30 even without driving the counter electrode 22 with alternating current.

In a conventional liquid crystal display device, if either the cell thickness or the capacitance value of its storage capacitor varies, display non-uniformity will be observed and the display quality will be debased when the device is driven by capacitive coupling. On the other hand, in the liquid crystal display device 100 of this preferred embodiment, even if the thickness of the liquid crystal layer 30 varies within the plane of the display screen, the display non-uniformity can be minimized. This is because the smaller the thickness of the liquid crystal layer 30 in a region within the display plane is, the larger the pretilt angles defined by the alignment sustaining layers 33a and 33b are. Furthermore, if the thickness of the insulating layer 18 in the storage capacitor 42 varies within the display plane, the display non-uniformity can also be minimized because the smaller the thickness of the insulating layer 18 in a region within the display plane is, the smaller the pretilt angles defined by the alignment sustaining layers 33a and 33b are.

Hereinafter, it will be described in detail how to fabricate the liquid crystal display device 100 and why the liquid crystal display device 100 can minimize the display non-uniformity. FIGS. 5(a) through 5(c) are cross-sectional views schematically illustrating respective manufacturing process steps to be performed to fabricate the liquid crystal display device 100.

First of all, as shown in FIG. 5(a), an LCD panel 100a including an active-matrix substrate 10, a counter substrate 20 and a liquid crystal layer 30 is provided. The active-matrix substrate 10 and the counter substrate 20 may be fabricated by any of various known processes. The LCD panel 100a to provide in this process step includes a photopolymerizable compound in its liquid crystal layer 30. Such a liquid crystal layer 30 can be obtained by adding a predetermined amount of a photopolymerizable compound to a nematic liquid crystal material with negative dielectric anisotropy. The photopolymerizable compound is preferably a monomer or an oligomer having a functional group that can produce a radical polymerization reaction such as an acrylate group, a methacrylate group or a vinyl group. In terms of reactivity, the monomer or oligomer preferably includes an acrylate group or a methacrylate group, and a multi-functional one is particularly preferred, among other things. Furthermore, if a photopolymerizable compound with a liquid crystal skeleton is used, the alignment of the liquid crystal molecules 31 can be sustained with even more stability. More particularly, a cyclic structure or a condensation structure to which an acrylate group or a methacrylate group bonds directly as disclosed in Japanese Patent Application Laid-Open Publication No. 2003-307720 is preferred.

Next, as shown in FIG. 5(b), the photopolymerizable compound in the liquid crystal layer 30 is polymerized with a voltage applied to the liquid crystal layer 30 in the LCD panel 100a. The voltage is applied to the liquid crystal layer 30 with the polarity of the voltage inverted periodically so that no DC voltage is applied to the liquid crystal layer 30 (i.e., AC driving is carried out). The photopolymerizable compound is polymerized by irradiating the liquid crystal layer 30 with light (more specifically, an ultraviolet ray). The intensity and duration of the ultraviolet ray radiated are appropriately determined by what kind of photopolymerizable compound is used. In any case, it is preferred that the liquid crystal layer 30 be irradiated with an ultraviolet ray that has come from under the active-matrix substrate 10 as shown in FIG. 5(b). This is because if the liquid crystal layer 30 were irradiated with an ultraviolet ray that has come from over the counter substrate 20, the ultraviolet ray would be partially absorbed into the color filters.

By polymerizing the photopolymerizable compound, the two alignment sustaining layers 33a and 33b shown in FIG. 5(c) are obtained. These alignment sustaining layers 33a and 33b are formed with a voltage applied to the liquid crystal layer (i.e., with the liquid crystal molecules 31 caused to have a predetermined alignment state by the electric field that has been generated between the pixel electrodes 12 and the counter electrode 22). For that purpose, the alignment sustaining layers 33a and 33b fix the alignment state of the liquid crystal molecules 31 on the vertical alignment films 32a and 32b. Such a process step for forming the alignment sustaining layers 33a and 33b by photo-polymerizing the photopolymerizable compound with a predetermined voltage applied to the liquid crystal layer 30 will sometimes be referred to herein as a "PSA process". After these alignment sustaining layers 33a and 33b have been formed, polarizers or phase plates are attached if necessary to the outer surfaces of the substrates 10 and 20, thereby completing the liquid crystal display device 100.

According to the manufacturing process of this preferred embodiment, a voltage is applied to the liquid crystal layer 30 in the PSA process (i.e., the process step shown in FIG. 5(b)) in a totally different way from the conventional process. Hereinafter, it will be described in detail what is the difference between those two processes.

Figure 6:
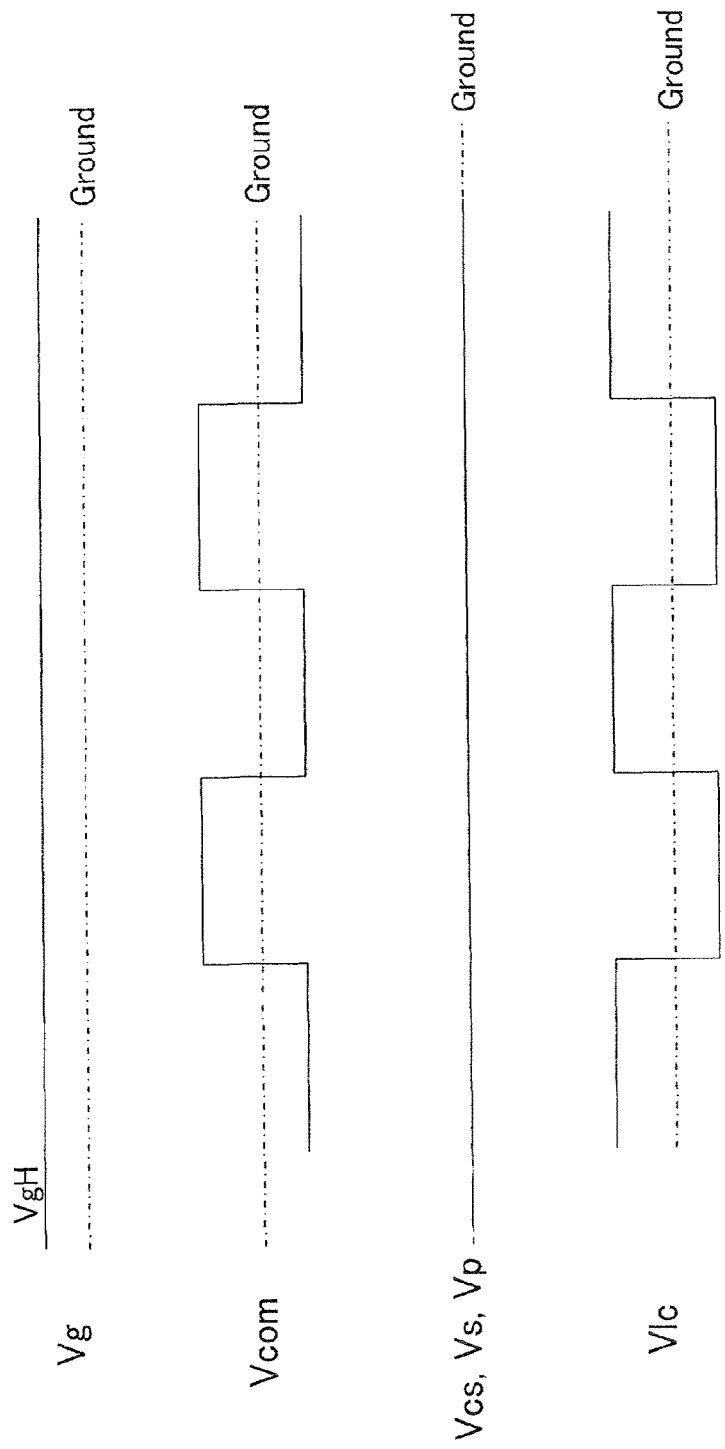
FIG. 6 shows how voltages are applied in a conventional PSA process.

First of all, it will be described with reference to FIG. 6 how the voltage is applied in the conventional process. FIG. 6 shows the waveforms of a voltage Vg on the scan line 14, a voltage Vcom at the counter electrode 22, a voltage Vcs on the storage capacitor line 16, a voltage Vs on the signal line 15, a voltage Vp at the pixel electrode 12 and a voltage Vlc applied to the liquid crystal layer 30.

As shown in FIG. 6, the voltage Vg on the scan line is always VgH, thus keeping every TFT 13 ON (i.e., electrically continuous) continuously. By setting the voltage Vs on the signal line 15 to be equal to the ground potential GND in such a state, the voltage Vp at the pixel electrode 12 is fixed at the GND level. At this time, the voltage Vcs on the storage capacitor line 16 is also at the GND level. If the counter electrode 22 is driven with alternating current in such a state, an AC voltage is applied to the liquid crystal layer 30. Alternatively, the voltage Vcom at the counter electrode 22 may be fixed at the GND level by driving the signal line 15 with alternating current. Or the counter electrode 22 may also be driven with alternating current in the inverse phase with respect to the signal line 15. However, it is impossible to minimize the display non-uniformity by any of these conventional voltage application methods.

Figure 7:
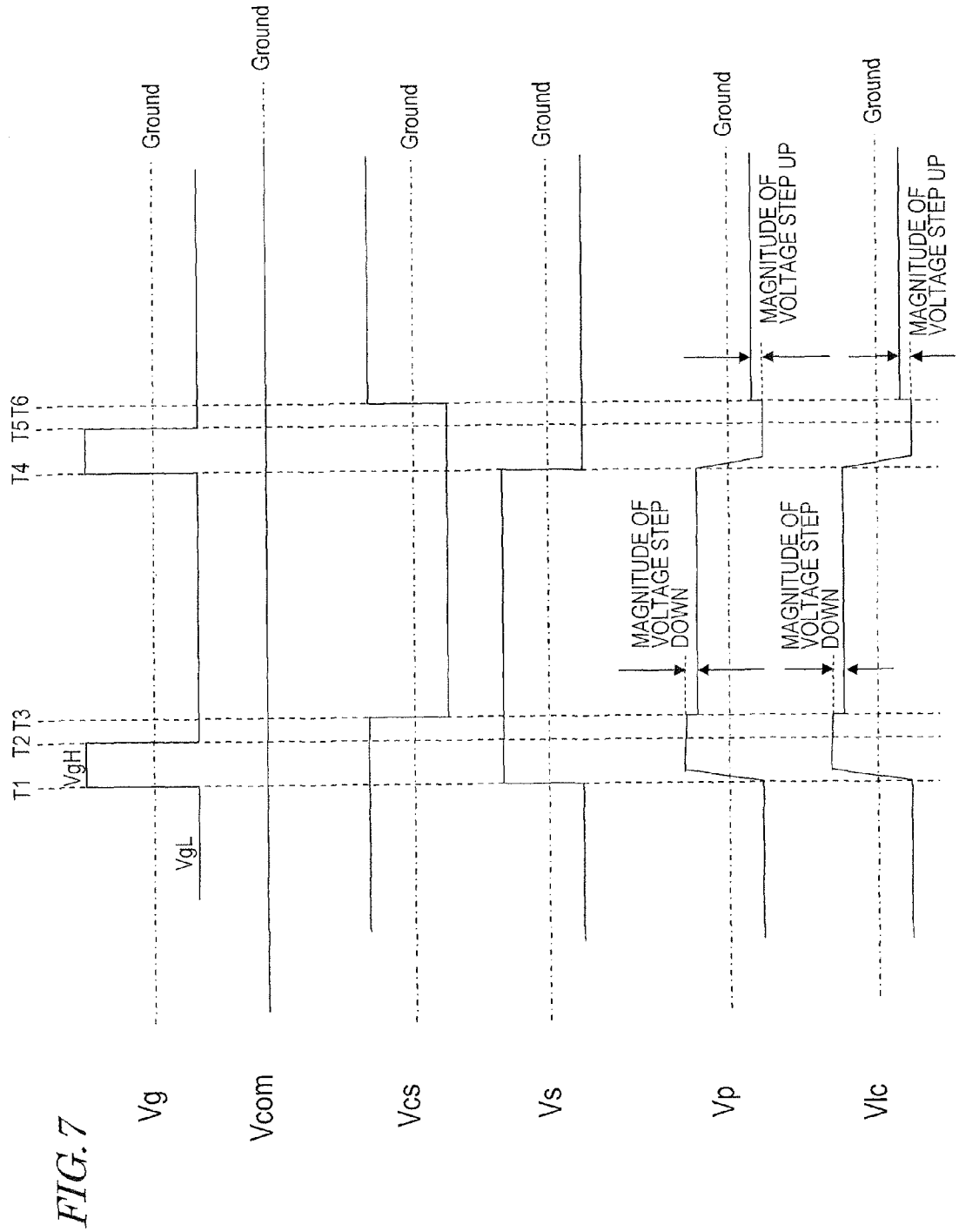
FIG. 7 shows how voltages are applied in the PSA process while the liquid crystal display device 100 is being fabricated.

Next, it will be described with reference to FIG. 7 how the voltage is applied according to this preferred embodiment. FIG. 7 shows the waveforms of a voltage Vg on the scan line 14, a voltage Vcom at the counter electrode 22, a voltage Vcs on the storage capacitor line 16, a voltage Vs on the signal line 15, a voltage Vp at the pixel electrode 12 and a voltage Vlc applied to the liquid crystal layer 30.

First of all, when the voltage Vg on the scan line 14 rises from VgL to VgH at a time T1, the TFT 13 turns ON (i.e., gets electrically continuous) and the voltage Vs (which is a positive voltage in this example) on the signal line 15 is transferred to the pixel electrode 12, thereby charging the liquid crystal capacitor 41. Meanwhile, the voltage Vcom at the counter electrode 22 is fixed at the GND level.

Next, when the voltage Vg on the scan line 14 falls from VgH to VgL at a time T2, the TFT 13 turns OFF (i.e., gets electrically discontinuous) and the pixel electrode 12 is electrically disconnected from the signal line 15. So is the storage capacitor electrode 17 at this time.

Subsequently, when the voltage Vcs on the storage capacitor line 16 inverts its polarity into the opposite one (e.g., from the positive voltage into a negative one in this example) at a time T3, the voltage Vp at the pixel electrode 12 also changes. Specifically, the positive voltage Vp is stepped down by a certain amount. And when the voltage Vp at the pixel electrode 12 is stepped down, the voltage Vlc applied to the liquid crystal layer 30 is also stepped down.

After that, the voltage Vlc applied to the liquid crystal layer 30 that has been stepped down will be maintained until the voltage on the pixel is rewritten next time (i.e., through a time T4). And when the voltage Vg on the scan line 14 rises again from VgL to VgH at the time T4, the TFT 13 turns ON and the voltage Vs (which is a negative voltage in this example) on the signal line 15 is transferred to the pixel electrode 12, thereby charging the liquid crystal capacitor 41.

Next, when the voltage Vg on the scan line 14 falls from VgH to VgL at a time T5, the TFT 13 turns OFF and the pixel electrode 12 is electrically disconnected from the signal line 15. So is the storage capacitor electrode 17 at this time.

Subsequently, when the voltage Vcs on the storage capacitor line 16 inverts its polarity into the opposite one (e.g., from the negative voltage into a positive one in this example) at a time T6, the voltage Vp at the pixel electrode 12 also changes. Specifically, the negative voltage Vp is stepped up by a certain amount. And when the voltage Vp at the pixel electrode 12 is stepped up, the voltage Vlc applied to the liquid crystal layer 30 is also stepped up. After that, the voltage Vlc applied to the liquid crystal layer 30 that has been stepped up will be maintained until the voltage on the pixel is rewritten next time.

As described above, in the manufacturing process of this preferred embodiment, the step of forming the alignment sustaining layers 33a and 33b (i.e., the PSA process) includes the steps of: i) applying a predetermined voltage between the pixel electrode 12 and the counter electrode 22 while the TFT (switching element) 13 is in ON state (i.e., the process steps to be performed from the time T1 through the time T2 and from the time T4 through the time T5 shown in FIG. 7); and ii) changing the voltage at the storage capacitor counter electrode 19 (i.e., the voltage supplied from the storage capacitor line 16) into a voltage, of which the polarity is opposite to the voltage at the storage capacitor counter electrode 19 in the step i), after the TFT 13 in ON state has been turned OFF (i.e., the process steps to be performed at the times T3 and T6 shown in FIG. 7).

The variation Vbs in the voltage Vlc applied to the liquid crystal layer 30 in the step ii) is calculated by the following equation:

$$Vbs=(Ccs/Cpix)\cdot \Delta Vcs$$

where Ccs is the capacitance value of the storage capacitor 42, Cpix is the capacitance value of the pixel capacitor, and ΔVcs is the amplitude of the voltage on the storage capacitor line 16. The capacitance value Cpix of the pixel capacitor is substantially equal to the sum of the respective capacitance values Clc and Ccs of the liquid crystal capacitor 41 and the storage capacitor 42 (i.e., Cpix≈Clc+Ccs).

If the cell thickness (corresponding to the thickness of the liquid crystal layer 30) is smaller than a normal (or ordinary) value, the respective capacitance values Clc and Cpix of the liquid crystal capacitor 41 and the pixel capacitor both increase. As a result, the variation Vbs decreases as can be seen from the equation just described. That is to say, the magnitudes of step-down of the voltage Vlc at the times T3 and T6 shown in FIG. 7 decrease. Consequently, in a region with a smaller cell thickness, a higher voltage Vlc is applied to the liquid crystal layer 30 than in a region with a normal cell thickness.

Figure 8:
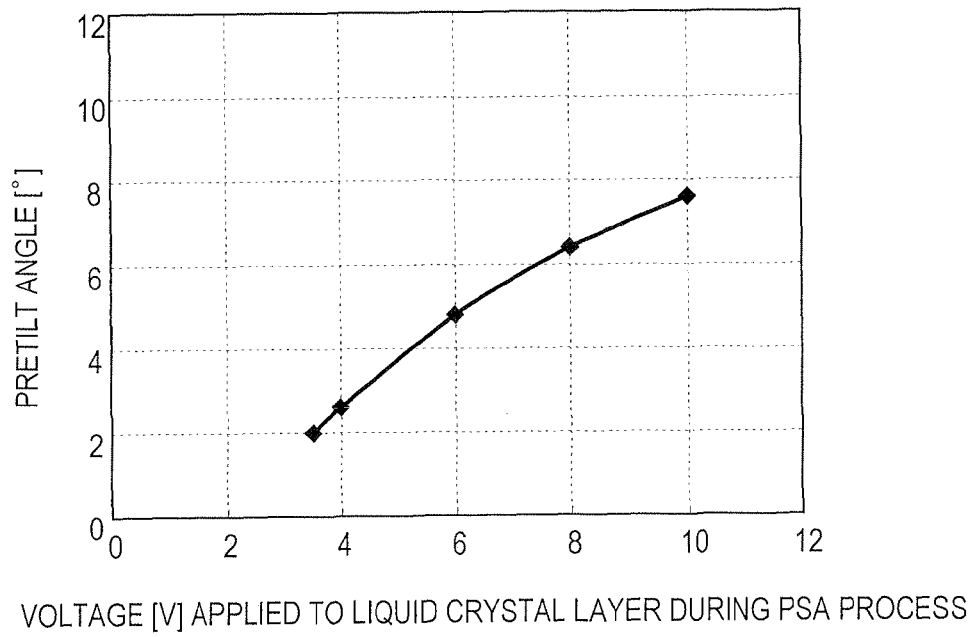
FIG. 8 is a graph showing how the pretilt angle is defined by the voltage applied to the liquid crystal layer during the PSA process.

FIG. 8 shows how the pretilt angle is defined by the voltage Vlc applied to the liquid crystal layer 30 during the PSA process and by the alignment sustaining layers 33a and 33b. As can be seen from FIG. 8, the pretilt angle increases or decreases according to the magnitude of the voltage Vlc applied during the PSA process. Specifically, as shown in FIG. 8, the higher the applied voltage Vlc, the larger the pretilt angle. And the lower the applied voltage Vlc, the smaller the pretilt angle. Consequently, the pretilt angle is larger in a region with a relatively small cell thickness than in a region with a normal cell thickness.

Figure 9:
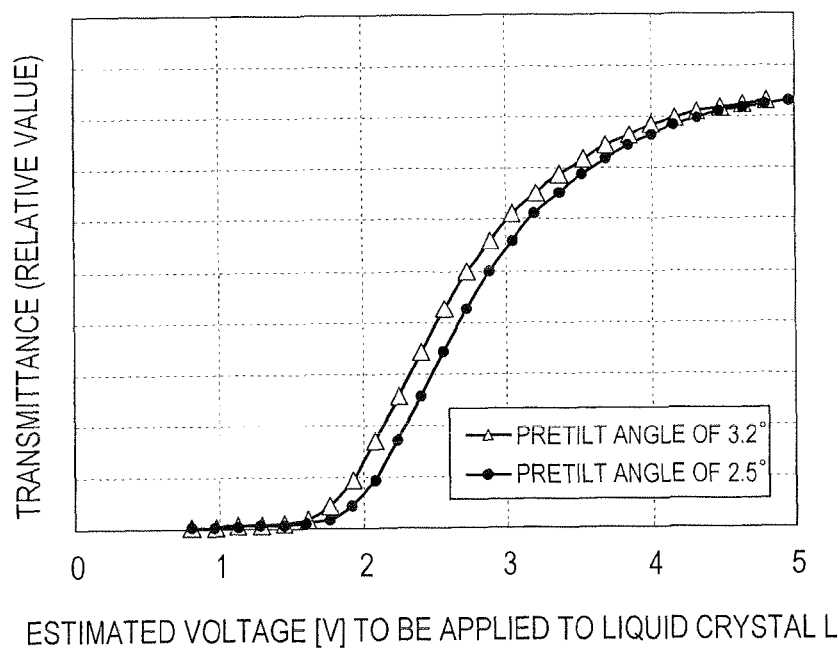
FIG. 9 is a graph showing how the voltage-transmittance characteristic changes with the pretilt angle.

FIG. 9 shows how the voltage-transmittance characteristic changes with the pretilt angle. Specifically, the two curves shown in FIG. 9 represent the voltage-transmittance characteristics measured at pretilt angles of 2.5 and 3.2 degrees, respectively. As can be seen from FIG. 9, if the pretilt angle is increased, the voltage-transmittance curve will shift toward a low voltage range. That is to say, supposing the applied voltage is the same, a region with the larger pretilt angle has a higher transmittance than a region with the smaller pretilt angle.

As can be seen, according to the manufacturing process of this preferred embodiment, a region with the smaller cell thickness has a larger pretilt angle and a higher transmittance than the other region with the normal cell thickness. That is why even though such a region with the smaller cell thickness would otherwise look darker than the other region with the normal cell thickness, such a defect can be compensated for by itself according to the present invention by controlling appropriately the voltages applied during the PSA process. Consequently, the region with the smaller cell thickness comes to have almost the same voltage-transmittance characteristic as the other region with the normal cell thickness.

Conversely, a region with a greater cell thickness has a smaller pretilt angle and a lower transmittance than the other region with the normal cell thickness. That is why even though such a region with the greater cell thickness would otherwise look brighter than the other region with the normal cell thickness, such a defect can be compensated for by itself according to the present invention by controlling appropriately the voltages applied during the PSA process. Consequently, the region with the greater cell thickness comes to have almost the same voltage-transmittance characteristic as the other region with the normal cell thickness.

As described above, in the liquid crystal display device 100 fabricated by the manufacturing process of this preferred embodiment, the pretilt angles are defined so as to cancel the difference in transmittance that has been caused due to a variation in cell thickness. As a result, the display non-uniformity that would otherwise be sensible if the cell thickness varied can be minimized and the display quality can be improved according to the present invention.

Also, if the capacitance value Ccs of the storage capacitor 42 is larger than its normal (or ordinary) value, the variation Vbs in the voltage Vlc applied to the liquid crystal layer 30 increases as can be seen from the equation mentioned above.

Specifically, the magnitude of step-down of the voltage Vlc at the time T3 shown in FIG. 7 and the magnitude of step-up of the voltage Vlc at the time T6 both increase in such a situation. Consequently, a region with the larger capacitance value Ccs comes to have a higher voltage Vlc applied to the liquid crystal layer 30 than a region with the normal capacitance value Ccs.

That is why a region with the larger storage capacitor (42) capacitance value Ccs has a smaller pretilt angle and a lower transmittance than the other region with the normal capacitance value Ccs. That is why even though such a region with the larger storage capacitor (42) capacitance value Ccs would otherwise look brighter than the other region with the normal capacitance value Ccs, such a defect can be compensated for by itself according to the present invention by controlling appropriately the voltages applied during the PSA process. Consequently, the region with the larger storage capacitor (42) capacitance value Ccs comes to have almost the same voltage-transmittance characteristic as the other region with the normal capacitance value Ccs.

On the other hand, a region with the smaller storage capacitor (42) capacitance value Ccs has a larger pretilt angle and a higher transmittance than the other region with the normal capacitance value Ccs. That is why even though such a region with the smaller storage capacitor (42) capacitance value Ccs would otherwise look darker than the other region with the normal capacitance value Ccs, such a defect can be compensated for by itself according to the present invention by controlling appropriately the voltages applied during the PSA process. Consequently, the region with the smaller storage capacitor (42) capacitance value Ccs comes to have almost the same voltage-transmittance characteristic as the other region with the normal capacitance value Ccs.

As described above, in the liquid crystal display device 100 fabricated by the manufacturing process of this preferred embodiment, the pretilt angles are defined so as to cancel the difference in transmittance that has been caused due to a variation in the capacitance value Ccs of the storage capacitor 42. As a result, the display non-uniformity that would otherwise be sensible if the storage capacitor (42) capacitance value Ccs varied can be minimized and the display quality can be improved according to the present invention.

According to the voltage application method (to adopt during the PSA process) of this preferred embodiment, the voltage Vcs on the storage capacitor line 16 is changed (i.e., has its polarity inverted) at a predetermined timing, thereby changing the voltage Vlc applied to the liquid crystal layer 30 as can be seen from FIG. 7. That is why the voltage application method of this preferred embodiment can be carried out using a capacitive coupling driving scheme, which may be the one disclosed in Patent Document No. 1, for example.

The amplitude ΔVcs of the voltage Vcs on the storage capacitor line 16 is appropriately determined with the respective capacitance values Clc and Ccs of the liquid crystal capacitor 41 and the storage capacitor 42 taken into account so as to compensate for the shift of the voltage-transmittance characteristic just as intended. Hereinafter, it will be described how the amplitude Vcs may be set.

For example, if the liquid crystal capacitor 41 has a capacitance value Clc of 120 fF (during white display) and the storage capacitor 42 has a capacitance value Ccs of 200 fF, the voltages Vs and Vcs on the signal line 15 and the storage capacitor line 16 may be set to be ±14.5 V and ±8.5 V, respectively (i.e., ΔVcs=17 V). In that case, the variation Vbs in voltage in the region with the normal cell thickness is calculated to be approximately 10.6 V by the following equation:

$$Vbs = (Ccs/Cpix) \cdot \Delta Vcs$$
$$= (200/200 + 120) \cdot 17$$
$$= (0.625) \cdot 17$$
$$\approx 10.6$$

That is why the voltage Vlc that was written when the TFT 13 was ON (i.e., from the time T1 through the time T2 shown in FIG. 7) is stepped down from +14.5 V by 10.6 V and decreases to +3.9 V. As can be seen from FIG. 8, if the PSA process is carried out with a voltage Vlc of +3.9 V applied to the liquid crystal layer 30, the pretilt angle becomes 2.5 degrees.

On the other hand, if the cell thickness is smaller than the normal value by 0.3 μm (i.e., if the cell thickness decreases to 2.7 μm), the liquid crystal capacitor 41 has a capacitance value Clc of 132 fF (during white display). In that case, the variation Vbs in the voltage Vlc applied to the liquid crystal layer 30 in such a region in which the cell thickness has decreased by 0.3 μm is calculated to be approximately 10.2 V by the following equation:

$$Vbs = (Ccs/Cpix) \cdot \Delta Vcs$$
$$= (200/200 + 132) \cdot 17$$
$$= (0.602) \cdot 17$$
$$\approx 10.2$$

That is why the voltage Vlc that was written when the TFT 13 was ON (i.e., from the time T1 through the time T2 shown in FIG. 7) is stepped down from +14.5 V by 10.2 V and decreases to +4.3 V. As can be seen from FIG. 8, if the PSA process is carried out with a voltage Vlc of +4.3 V applied to the liquid crystal layer 30, the pretilt angle becomes 3.2 degrees.

Figure 13:
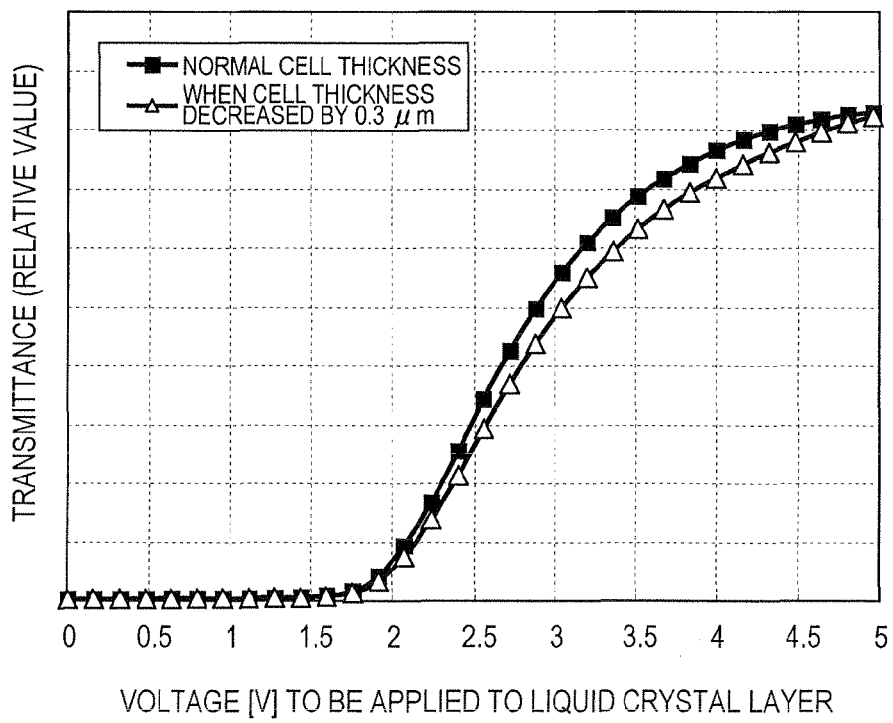
FIG. 13 is a graph showing the voltage-transmittance characteristics of a liquid crystal display device with varying cell thicknesses.
Figure 14:
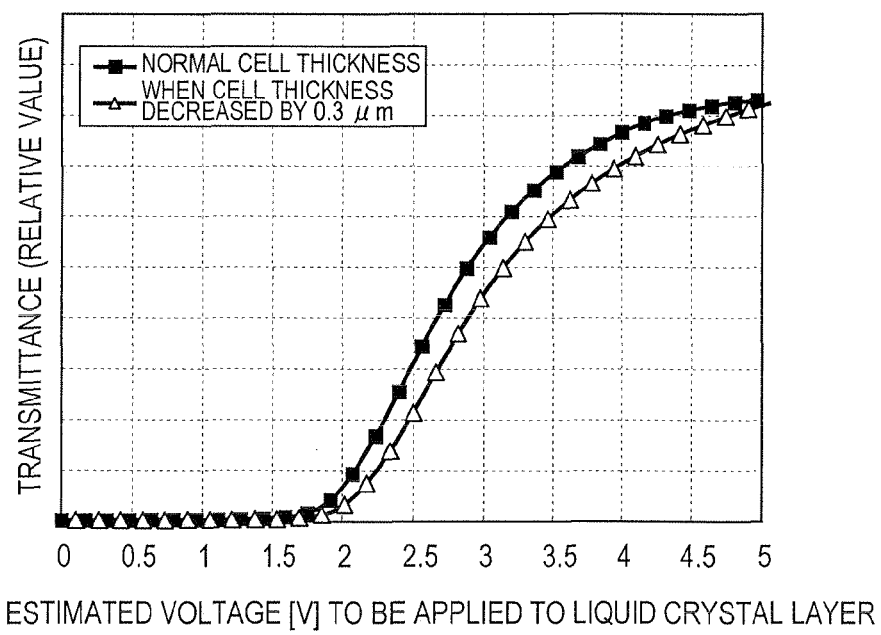
FIG. 14 is a graph showing the voltage-transmittance characteristic of a liquid crystal display device that has varying cell thicknesses and is driven by capacitive coupling.

As shown in FIG. 9, if the pretilt angle is 3.2 degrees, the voltage-transmittance curve shifts toward the low voltage range by about 0.15 V compared to a situation where the pretilt angle is 2.5 degrees. On the other hand, as shown in FIG. 13, the voltage-transmittance curve has already shifted toward the high voltage range in a region in which the cell thickness is smaller by 0.3 μm than the normal value compared to the other region with the normal cell thickness. For example, at a grayscale tone, the voltage-transmittance curve has shifted by 0.1 to 0.15 V toward the high voltage range. Consequently, the shift of the voltage-transmittance curve due to the increase in pretilt angle and that of the voltage-transmittance curve due to the decrease in cell thickness will cancel each other, thus reducing the variation in voltage-transmittance characteristic and minimizing the display non-uniformity. Compare the results shown in FIGS. 13 and 14 to each other, and it can be seen easily that the voltage-transmittance curve will shift more significantly if the liquid crystal display device completed is driven by capacitive coupling. Even so, by adopting the voltage application method of this preferred embodiment, the display non-uniformity can still be minimized.

Figure 10:
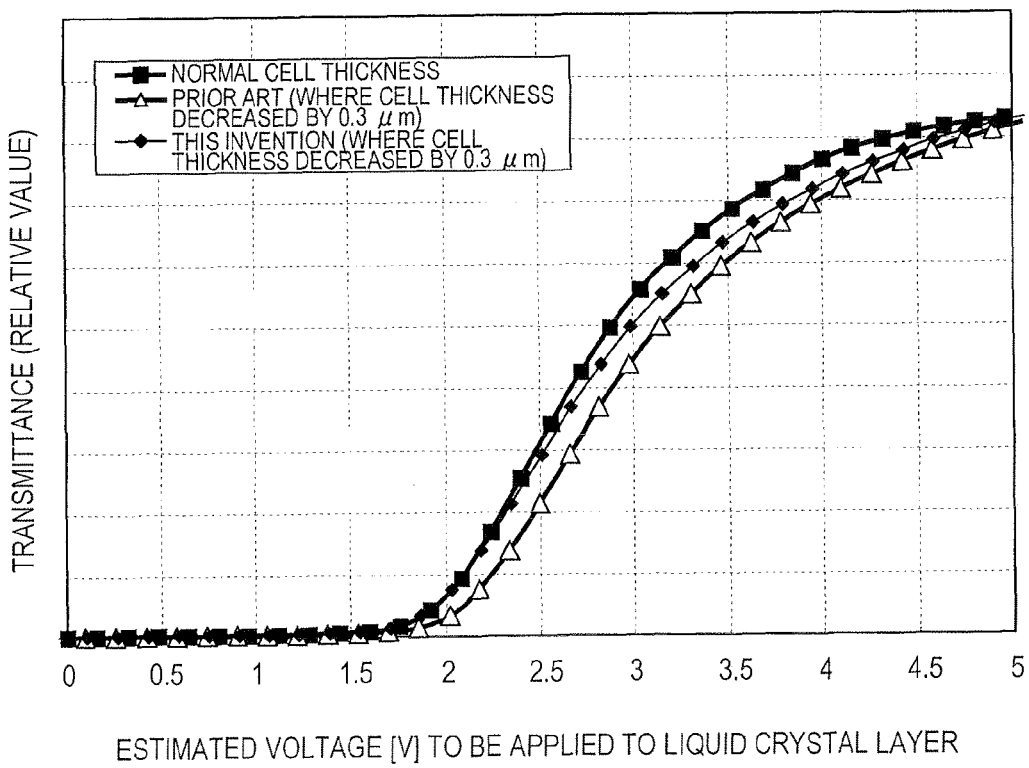
FIG. 10 is a graph showing how the voltage-transmittance characteristic of the device driven by capacitive coupling varies depending on whether the PSA process is performed by the voltage application method shown in FIG. 7 or the conventional one.

FIG. 10 shows how the voltage-transmittance characteristic of the liquid crystal display device driven by the capacitive coupling method varies depending on whether the PSA process is performed by adopting the voltage application method of this preferred embodiment or the conventional one. As can be seen from FIG. 10, if the conventional voltage application method is used, the voltage-transmittance curve shifts significantly in a region with the smaller cell thickness compared to the other region with the normal cell thickness. On the other hand, if the voltage application method of this preferred embodiment is used, the shift of the voltage-transmittance curve between the region with the smaller cell thickness and the region with the normal cell thickness can be much smaller than in the conventional method, and those two curves almost agree with each other at low grayscale tones, among other things. As a result, the display non-uniformity (to be sensible particularly easily at such low grayscale tones) can be minimized.

The variation Vbs in voltage in the region in which the capacitance value Ccs of the storage capacitor 42 is larger by 10% than the normal value (i.e., Ccs=220 fF) is calculated to be approximately 11.0 V by the following equation:

$$Vbs = (Ccs / Cpix) \cdot \Delta Vcs$$
$$= (200 / 200 + 120) \cdot 17$$
$$= (0.647) \cdot 17$$
$$\approx 11.0$$

Figure 15:
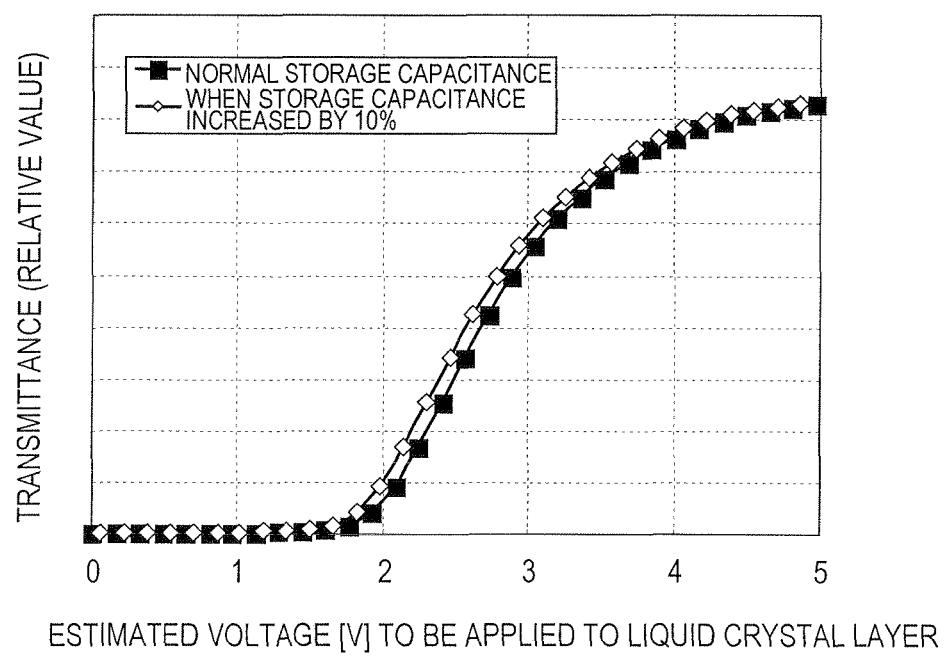
FIG. 15 is a graph showing the voltage-transmittance characteristic of a liquid crystal display device in which the capacitance value of the storage capacitor varies and which is driven by capacitive coupling.

That is why the voltage Vlc that was written when the TFT 13 was ON (i.e., from the time T1 through the time T2 shown in FIG. 7) is stepped down from +14.5 V by 11.0 V and decreases to +3.5 V. As can be seen from FIG. 8, if the PSA process is carried out with a voltage Vlc of +3.5 V applied to the liquid crystal layer 30, the pretilt angle becomes 2.0 degrees. Thus, the voltage-transmittance curve in such a region with the larger storage capacitor (42) capacitance value Ccs shifts toward the high voltage range compared to the region with the normal capacitance value Ccs. Consequently, that shift toward the high voltage range and the shift toward the low voltage range shown in FIG. 15 will cancel each other, thus reducing the variation in voltage-transmittance characteristic and minimizing the display non-uniformity.

Figure 11:
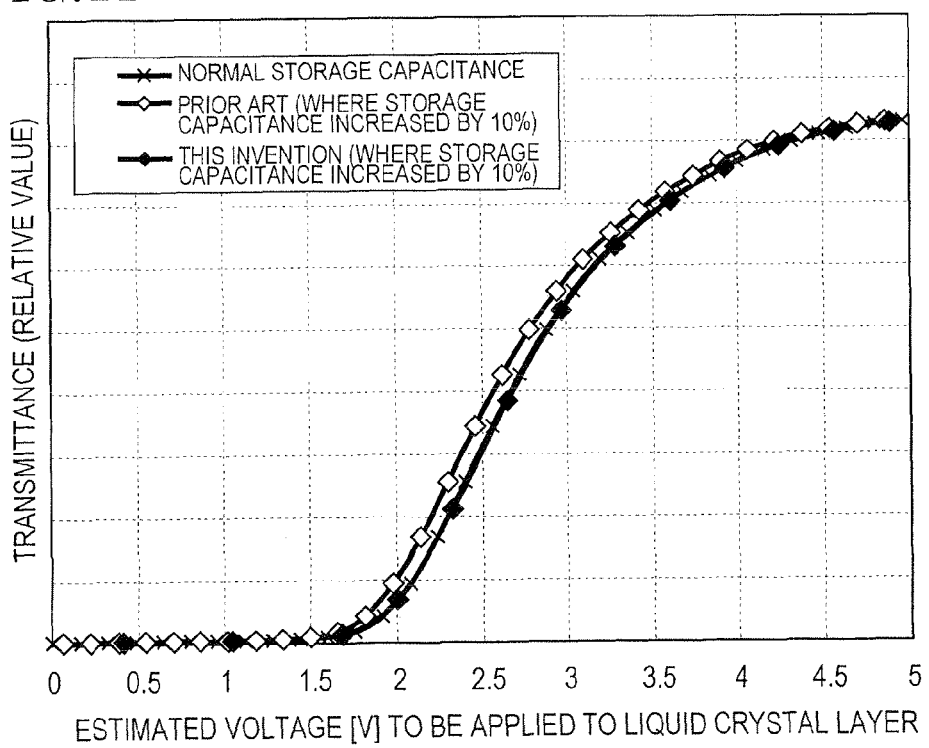
FIG. 11 is a graph showing how the voltage-transmittance characteristic of the device driven by capacitive coupling varies depending on whether the PSA process is performed by the voltage application method shown in FIG. 7 or the conventional one.

FIG. 11 shows how the voltage-transmittance characteristic of the liquid crystal display device driven by the capacitive coupling method varies depending on whether the PSA process is performed by adopting the voltage application method of this preferred embodiment or the conventional one. As can be seen from FIG. 11, if the conventional voltage application method is used, the voltage-transmittance curve shifts significantly in a region with the larger storage capacitor (42) capacitance value Ccs compared to the other region with the normal capacitance value Ccs. On the other hand, if the voltage application method of this preferred embodiment is used, the shift of the voltage-transmittance curve between the region with the larger storage capacitor (42) capacitance value Ccs and the region with the normal capacitance value Ccs can be much smaller than in the conventional method, and those two curves almost agree with each other. As a result, the display non-uniformity can be minimized.

In the example illustrated in FIG. 7, when the PSA process is carried out, a constant voltage is supposed to be applied to the counter electrode 22 and an oscillating voltage is supposed to be applied to the signal line 15. However, this is just an example and the present invention is in no way limited to that specific example. An alternative voltage application method that may also be adopted for the PSA process is shown in FIG. 12.

Figure 12:
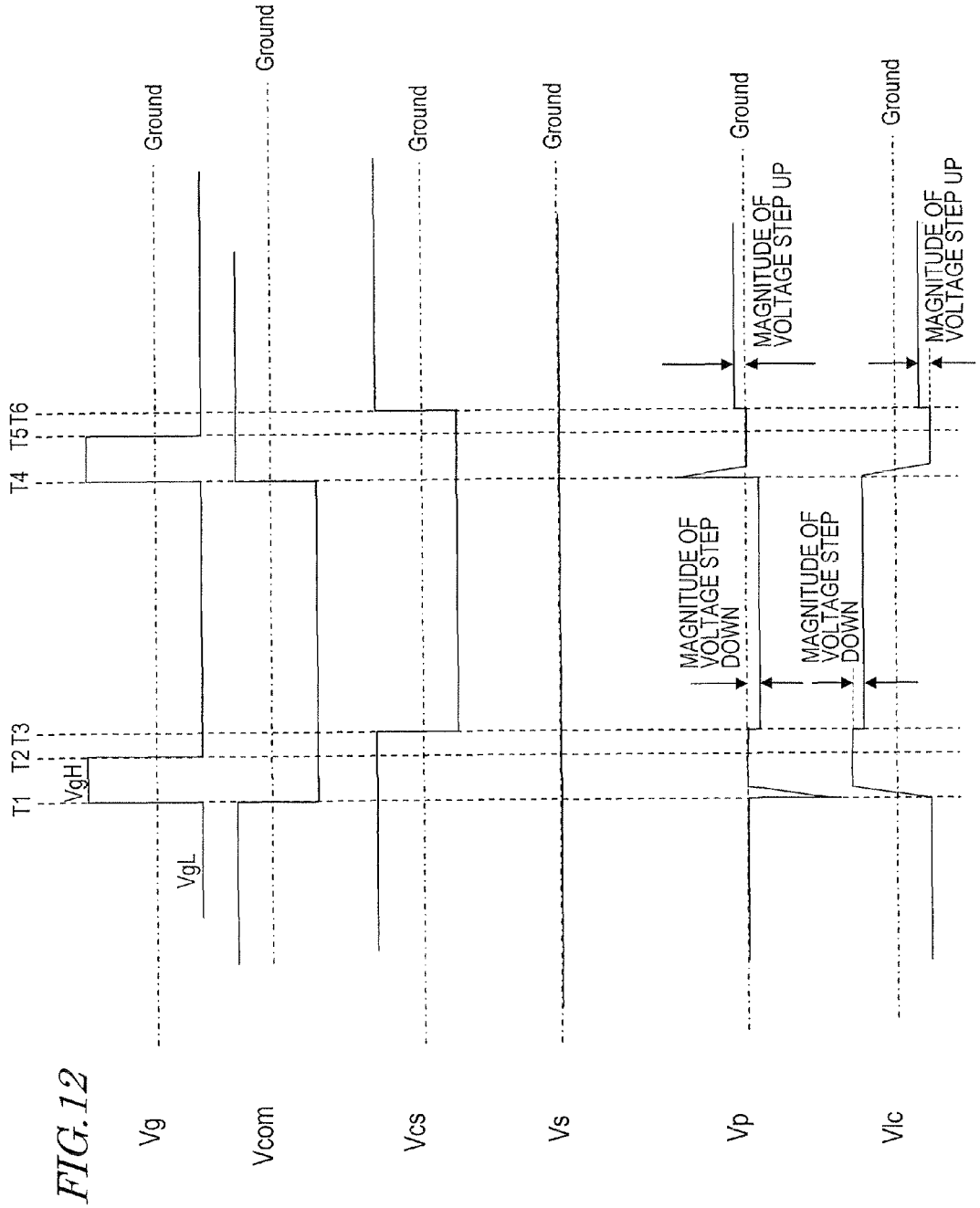
FIG. 12 shows an alternative voltage application method that may also be adopted for the PSA process when the liquid crystal display device 100 is fabricated.

Contrary to the example shown in FIG. 7, a constant voltage is applied to the signal line 15 and an oscillating voltage is applied to the counter electrode 22 in the example shown in FIG. 12. Also, in the example shown in FIG. 7, some inconvenience (such as breakdown of a signal line driver on the active-matrix substrate 10) might be caused by applying a relatively high voltage to the signal line 15. In the example shown in FIG. 12, on the other hand, there is no need to apply such a high voltage to the signal line 15 (which may be fixed at the GND level, for example), and there is no need to worry about such an inconvenience, either.

Furthermore, if an oscillating voltage is applied to the signal line 15 as shown in FIG. 7, it is more preferred that the voltage Vs on the signal line 15 after the TFT 13 has been turned OFF have been changed in advance to the vicinity of the voltage that would be reached by the pixel electrode 12 after having been stepped down (or stepped up) due to the variation in voltage on the storage capacitor line 16. Such a voltage may be about ±3.9 V under the condition mentioned above. That is to say, the process step of forming the alignment sustaining layers 33a and 33b preferably further includes the step iii) of changing the voltage Vs on the signal line 15 after the TFT 13 in ON state has been turned OFF. And it is preferred that the voltages Vs and Vp on the signal line 15 and at the pixel electrode 12 that have been changed in the steps iii) and ii), respectively, be substantially equal to each other.

In that case, even if the TFT 13 has not been turned OFF completely and a very small amount of leakage current has been generated by radiating an ultraviolet ray during the PSA process, it is still possible to prevent such leakage current from affecting the PSA process adversely. It should be noted that even if the TFT 13 is not quite OFF during the PSA process, the effect of reducing the display non-uniformity would just diminish slightly and the display operation itself would not be affected basically. Optionally, the step iii) could be performed either simultaneously with, or even before, the step ii). In the latter case, the step iii) will be performed between the steps i) and ii).

In the preferred embodiments described above, the present invention is supposed to be implemented as a CPA mode liquid crystal display device 100. However, the present invention is in no way limited to those specific preferred embodiments. Rather the present invention is broadly applicable to any other type of liquid crystal display device if the device includes a vertical alignment liquid crystal layer and if each pixel thereof has a set of multiple domains in which liquid crystal molecules tilt in mutually different azimuths when a voltage is applied to the liquid crystal layer. That is to say, the present invention is applicable to a multi-domain liquid crystal display device, e.g., a multi-domain vertical alignment (MVA) mode LCD, which is disclosed in Japanese Patent Application Laid-Open Publication No. 11-242225, for example.

INDUSTRIAL APPLICABILITY

The present invention provides a liquid crystal display device that can minimize the display non-uniformity even when driven by capacitive coupling and also provides a method for fabricating such a device. The present invention can be used effectively to make a liquid crystal display device by the PSA technology and is applicable effectively to a CPA mode LCD or an MVA mode LCD. The liquid crystal display device of the present invention may be an LCD in any of various sizes, including both small ones and big ones, for use in cellphones, PDAs, laptops, monitors and TV receivers, to name just a few.

REFERENCE SIGNS LIST

| | |
|---|---|
| 10 | active-matrix substrate (first substrate) |
| 11 | transparent substrate |
| 12 | pixel electrode |
| 12a | subpixel electrode |
| 13 | thin-film transistor (TFT) |
| 14 | scan line |
| 15 | signal line |
| 16 | storage capacitor line |
| 17 | storage capacitor electrode |
| 18 | insulating layer |
| 19 | storage capacitor counter electrode |
| 20 | counter substrate (second substrate) |
| 21 | transparent substrate |
| 22 | counter electrode |
| 30 | liquid crystal layer |
| 31 | liquid crystal molecule |
| 32a, 32b | vertical alignment film |
| 33a, 33b | alignment sustaining layer |
| 100a | LCD panel |
| 100 | liquid crystal display device |

The invention claimed is:

1. A method for fabricating a liquid crystal display device, the device including: an LCD panel that has a first substrate, a second substrate and a liquid crystal layer interposed between the first and second substrates; and a number of pixels that are arranged in matrix, the first substrate including: a pixel electrode, which is arranged in an associated one of the pixels; a switching element, which is electrically connected to the pixel electrode; a scan line for supplying a scan signal to the switching element; and a signal line for supplying a display signal to the switching element, the second substrate including a counter electrode that faces the pixel electrode, each said pixel including: a liquid crystal capacitor that is formed by its associated pixel electrode, the liquid crystal layer and the counter electrode; and a storage capacitor that is formed by a storage capacitor electrode, an insulating layer and a storage capacitor counter electrode, the storage capacitor electrode being electrically connected to the pixel electrode, the storage capacitor counter electrode facing the storage capacitor electrode with the insulating layer interposed, the LCD panel further including: two alignment films, one of which is arranged between the pixel electrode and the liquid crystal layer and the other of which is arranged between the counter electrode and the liquid crystal layer; and alignment sustaining layers, each of which is arranged on the surface of an associated one of the alignment films so as to contact with the liquid crystal layer, is made of a photopolymerization product, and defines the pretilt directions of liquid crystal molecules in the liquid crystal layer when no voltage is applied to the liquid crystal layer, wherein the method comprises the steps of:
providing the LCD panel that includes a photopolymerizable compound in the liquid crystal layer; and
forming the alignment sustaining layers by polymerizing the photopolymerizable compound in the liquid crystal layer of the LCD panel with the liquid crystal layer irradiated with light and supplied with a voltage simultaneously, wherein the step of forming the alignment sustaining layers includes the steps of:
i) applying a predetermined voltage between the pixel electrode and the counter electrode while the switching element is in ON state; and
ii) changing the voltage at the storage capacitor counter electrode into a voltage, of which the polarity is opposite to the voltage at the storage capacitor counter electrode in the step i), after the switching element in ON state has been turned OFF.

2. The method of claim 1, wherein the step of forming the alignment sustaining layers includes applying a constant voltage to the counter electrode and an oscillating voltage to the signal line, respectively.

3. The method of claim 1, wherein in the step ii), as the voltage at the storage capacitor counter electrode varies, the voltage at the pixel electrode also varies, and
wherein the step of forming the alignment sustaining layers further includes the step of iii) changing a voltage on the signal line after the switching element in ON state has been turned OFF, and wherein the voltages on the signal line and at the pixel electrode that have been changed in the steps iii) and ii), respectively, are substantially equal to each other.

4. The method of claim 1, wherein the step of forming the alignment sustaining layers includes applying a constant voltage to the signal line and an oscillating voltage to the counter electrode, respectively.

5. The method of claim 1, wherein each of the two alignment films is a vertical alignment film, and
wherein the liquid crystal layer is made of a liquid crystal material with negative dielectric anisotropy.

* * * * *